United States Patent
Sagi et al.

(10) Patent No.: US 11,391,836 B2
(45) Date of Patent: Jul. 19, 2022

(54) LIVELINESS DETECTION USING RADAR

(71) Applicant: QUALCOMM Incorporated, San Diego, CA (US)

(72) Inventors: Ariel Yaakov Sagi, Haifa (IL); Evyatar Hemo, Kiryat Bialik (IL); Evgeny Levitan, Haifa (IL); Sharad Sambhwani, San Diego, CA (US); Amichai Sanderovich, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 641 days.

(21) Appl. No.: 16/380,775

(22) Filed: Apr. 10, 2019

(65) Prior Publication Data

US 2020/0326422 A1    Oct. 15, 2020

(51) Int. Cl.
| | |
|---|---|
| *G01S 13/90* | (2006.01) |
| *G01S 7/41* | (2006.01) |
| *H04B 7/06* | (2006.01) |
| *H04B 17/336* | (2015.01) |
| *G01S 7/292* | (2006.01) |
| *G01S 13/524* | (2006.01) |

(52) U.S. Cl.
CPC ............ *G01S 13/90* (2013.01); *G01S 7/2927* (2013.01); *G01S 7/414* (2013.01); *G01S 13/5246* (2013.01); *G01S 13/9047* (2019.05); *H04B 7/0617* (2013.01); *H04B 17/336* (2015.01)

(58) Field of Classification Search
CPC ...... G01S 13/90; G01S 7/414; G01S 13/5246; G01S 13/9047; G01S 7/2927; H04B 7/0617; H04B 7/336
See application file for complete search history.

(56) References Cited

U.S. PATENT DOCUMENTS

| | | | | |
|---|---|---|---|---|
| 5,499,030 | A  * | 3/1996 | Wicks | G01S 7/292 |
| | | | | 342/159 |
| 9,739,881 | B1 * | 8/2017 | Pavek | G01S 13/89 |
| 2004/0150552 | A1 * | 8/2004 | Barbella | G01S 13/24 |
| | | | | 342/111 |

(Continued)

OTHER PUBLICATIONS

Texas Instruments: "People Tracking and Counting Reference Design Using mmWave Radar Sensor", TI Designs: TIDEP-01000, TIDUE71A—Mar. 2018—Revised Apr. 2018, 27 pages.

*Primary Examiner* — Thomas M Hammond, III

(74) *Attorney, Agent, or Firm* — Qualcomm Incorporated

(57) ABSTRACT

Disclosed are techniques for liveliness detection. In an aspect, a radar sensor of an electronic device transmits a radar frame comprising a plurality of bursts, each burst comprising a plurality of radar pulses, and receives a plurality of reflected radar pulses. The electronic device generates a radar image representing azimuth, elevation, range, and slow time measurements for the radar frame based on the plurality of reflected pulses, applies a Doppler FFT to the radar image to convert the radar image to represent azimuth, elevation, range, and velocity measurements for the radar frame, identifies at least one area of motion in the radar image based on velocity bins of the radar image, and detects a target dynamic object based on a CFAR detection applied over the range and azimuth measurements and a SNR threshold of the received plurality of reflected pulses associated with the at least one area of motion.

30 Claims, 12 Drawing Sheets

(56) References Cited

U.S. PATENT DOCUMENTS

| | | | |
|---|---|---|---|
| 2009/0085800 A1* | 4/2009 | Alland | G01S 7/034 |
| | | | 342/25 R |
| 2013/0169485 A1* | 7/2013 | Lynch | G01S 3/46 |
| | | | 342/417 |
| 2016/0259037 A1* | 9/2016 | Molchanov | G06V 40/28 |
| 2017/0082730 A1* | 3/2017 | Kishigami | H01Q 21/061 |
| 2017/0082732 A1* | 3/2017 | Oswald | G01S 13/42 |
| 2018/0348353 A1* | 12/2018 | Lien | G01S 7/006 |
| 2019/0285725 A1* | 9/2019 | Roger | G01S 13/584 |
| 2020/0072958 A1* | 3/2020 | Santra | G01S 13/88 |
| 2020/0119780 A1* | 4/2020 | Klemmer | H04B 7/0421 |
| 2020/0145042 A1* | 5/2020 | Kulkarni | G01S 13/867 |
| 2020/0309939 A1* | 10/2020 | Subburaj | G01S 13/584 |

* cited by examiner

| ANT5 |  | ANT4 | ANT22 | ANT20 |  |
|---|---|---|---|---|---|
| ANT2 | ANT3 | ANT6 | ANT21 | ANT19 | ANT18 |
| ANT1 | ANT7 | ANT0 | ANT16 | ANT23 | ANT17 |
| ANT15 | ANT9 | ANT14 | ANT25 | ANT24 | ANT31 |
| ANT8 | ANT11 | ANT13 | ANT28 | ANT27 | ANT26 |
|  | ANT10 | ANT12 | ANT30 | ANT29 |  |

LIVELINESS DETECTION USING RADAR

INTRODUCTION

Aspects of this disclosure relate generally to liveliness detection using radar.

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., LTE or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) wireless standard enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

To enhance throughput, among other things, 5G supports operation at very high and even extremely-high frequency (EHF) bands, such as millimeter wave (mmW) frequency bands (generally, wavelengths of 1 mm to 10 mm, or 30 GHz to 300 GHz). These extremely high frequencies may support very high throughput, such as up to 6 gigabits per second (Gbps). Near mmW frequencies may extend down to a frequency of 3 GHz with a wavelength of 100 millimeters. Super high frequency (SHF) bands extend between 3 GHz and 30 GHz, and are also referred to as centimeter wave.

One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss can be severe. For example, the propagation loss may be on the order of 22 to 27 dB, relative to that observed in either the 2.4 GHz, or 5 GHz bands. A mmW-capable base station and/or user equipment (UE) may therefore utilize beamforming to compensate for the extremely high path loss and short range.

Transmitters (e.g., a mmW-capable base station/UE) may use beamforming to extend radio frequency (RF) signal coverage. Transmit beamforming is a technique for focusing an RF signal in a specific direction. Traditionally, when a transmitter broadcasts an RF signal, it broadcasts the signal in all directions (omni-directionally). With transmit beamforming, the transmitter determines where a given target device is located (relative to the transmitter) and projects a stronger downlink RF signal in that specific direction, thereby providing a faster (in terms of data rate) and stronger RF signal for the receiving device(s).

To change the directionality of the RF signal when transmitting, a transmitter can control the phase and relative amplitude of the RF signal at each transmission point (e.g., antenna). For example, a transmitter may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., Reference Signal Received Power (RSRP), Signal-to-Noise plus Interference Ratio (SNIR), etc.) of the RF signals received from that direction.

While mmW RF signals are used for wireless communication, as in 5G wireless networks, mmW RF signals can be used for other purposes as well. For example, mmW RF signals can be used in weapons systems (e.g., as short-range fire-control radar in tanks and aircraft), security screening systems (e.g., in scanners that detect weapons and other dangerous objects carried under clothing), medicine (e.g., to treat disease by changing cell growth), and the like.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of liveliness detection using radar includes transmitting, by a radar sensor of an electronic device, a first radar frame comprising a plurality of bursts, each of the plurality of bursts comprising a plurality of radar pulses, receiving, at the radar sensor, a plurality of reflected radar pulses of the first radar frame, generating, by the electronic device, a first radar image representing azimuth, elevation, range, and slow time measurements for the first radar frame based on the received plurality of reflected radar pulses, applying, by the electronic device, a Doppler Fast Fourier Transform (FFT) to the first radar image to convert the first radar image to represent azimuth, elevation, range, and velocity measurements for the first radar frame, identifying, by the electronic device, at least one area of motion in the first radar image based on velocity bins of the first radar image, and detecting, by the electronic device, a target dynamic object based on a Constant False-Alarm Rate (CFAR) detection applied over the range and azimuth measurements and a Signal-to-Noise Ratio (SNR) threshold of the received plurality of reflected radar pulses associated with the at least one area of motion.

In an aspect, an apparatus for liveliness detection using radar includes a radar sensor of an electronic device configured to: transmit a first radar frame comprising a plurality of bursts, each of the plurality of bursts comprising a plurality of radar pulses, and receive a plurality of reflected radar pulses of the first radar frame, and at least one processor of the electronic device configured to: generate a first radar image representing azimuth, elevation, range, and slow time measurements for the first radar frame based on the received plurality of reflected radar pulses, apply a Doppler FFT to the first radar image to convert the first radar image to represent azimuth, elevation, range, and velocity measurements for the first radar frame, identify at least one area of motion in the first radar image based on velocity bins of the first radar image, and detect a target dynamic object based on a CFAR detection applied over the range and azimuth measurements and a SNR threshold of the received plurality of reflected radar pulses associated with the at least one area of motion.

In an aspect, an apparatus for liveliness detection using radar includes a means for wirelessly communicating of an electronic device configured to: transmit a first radar frame comprising a plurality of bursts, each of the plurality of bursts comprising a plurality of radar pulses, and receive a plurality of reflected radar pulses of the first radar frame, and a means for processing of the electronic device configured to: generate a first radar image representing azimuth, elevation, range, and slow time measurements for the first radar frame based on the received plurality of reflected radar pulses, apply a Doppler FFT to the first radar image to convert the first radar image to represent azimuth, elevation, range, and velocity measurements for the first radar frame, identify at least one area of motion in the first radar image based on velocity bins of the first radar image, and detect a target dynamic object based on a CFAR detection applied over the range and azimuth measurements and a SNR threshold of the received plurality of reflected radar pulses associated with the at least one area of motion.

In an aspect, a non-transitory computer-readable medium storing computer-executable instructions for liveliness detection using radar includes computer-executable instructions comprising at least one instruction instructing a radar sensor of an electronic device to transmit a first radar frame comprising a plurality of bursts, each of the plurality of bursts comprising a plurality of radar pulses, at least one instruction instructing the radar sensor to receive a plurality of reflected radar pulses of the first radar frame, at least one instruction instructing at least one processor of the electronic device to generate a first radar image representing azimuth, elevation, range, and slow time measurements for the first radar frame based on the received plurality of reflected radar pulses, at least one instruction instructing the at least one processor to apply a Doppler FFT to the first radar image to convert the first radar image to represent azimuth, elevation, range, and velocity measurements for the first radar frame, at least one instruction instructing the at least one processor to identify at least one area of motion in the first radar image based on velocity bins of the first radar image, and at least one instruction instructing the at least one processor to detect a target dynamic object based on a CFAR detection applied over the range and azimuth measurements and a SNR threshold of the received plurality of reflected radar pulses associated with the at least one area of motion.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 7 illustrates an exemplary antenna array, according to aspects of the disclosure.

DETAILED DESCRIPTION

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1A:
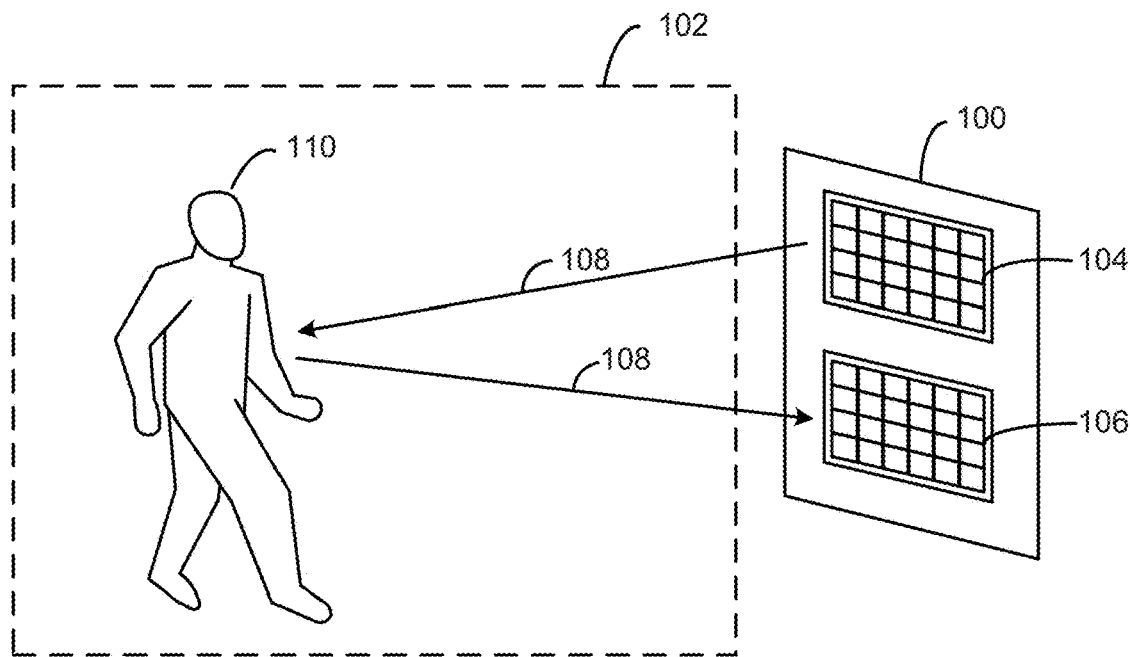
FIG. 1A is a simplified drawing illustrating the general process of collecting radio frequency (RF) image data, according to an aspect.

FIG. 1A is a simplified drawing illustrating the general process of transmitting and collecting radar (also referred to as radio, radio frequency, or RF) data, according to aspects of the disclosure. In the example of FIG. 1A, a radar communication component 100 is used to capture radar return data transmitted in an identification region 102, in a manner described below. The radar communication component 100 may be a component of an electronic device capable of transmitting and receiving mmW radar signals, such as a mmW-capable access point (AP), macro cell base station (e.g., gNodeB), small cell base station (e.g., Home gNodeB), smart speaker, UE, etc.

The radar communication component 100 may comprise two antenna arrays: a transmitter antenna array 104 comprising a plurality of transmitter antenna elements, and a receiver antenna array 106 comprising a plurality of receiver antenna elements. The number and configuration of antenna elements in each of the transmitter antenna array 104 and receiver antenna array 106 may vary, depending on desired functionality. Moreover, the radar communication component 100 may be multi-functional. That is, the radar communication component 100 may be utilized in other applications, such as wireless communication applications. As such, the number and configuration of antenna elements in the radar communication component 100 may be at least partially determined by the one or more additional functions of the radar communication component 100. In some aspects, for example, the radar communication component 100 may be utilized as a transceiver for an IEEE 802.11ad and/or IEEE 802.11ay wireless modem (e.g., a 60 GHz modem), which may be utilized by the electronic device to enable the electronic device to communicate using IEEE 802.11ad/ay technologies. In other aspects, the radar communication component 100 may be used to communicate using other mmW technologies.

During a scanning period (described in more detail below), the radar communication component 100 can use full-duplex radar by transmitting radio waves 108 from the transmitter antenna array 104, which may be reflected by an object 110 (e.g., a human or some other object) and received by the receiver antenna array 106. As described further below, the radio waves 108 may comprise one or more pulses that are transmitted by different transmitter antenna elements of the transmitter antenna array 104 and received by different receiver antenna elements of the receiver antenna array 106.

In an aspect the transmitter antenna array 104 and the receiver antenna array 106 may each comprise 32 antenna elements. The use of this many antenna elements in a radar communication component 100 with a relatively small form factor (that may be used, for example, in a mobile phone or wireless access point), and the ability to detect relatively fine features of an object 110, may be made possible by utilizing gigahertz-range frequencies. In some aspects, for example, signals in the 60 GHz medium (generally recognized as frequencies from 58-64 GHz) may be used. This can result in antenna elements that are only 2.5 mm wide. With a relatively large number of antenna elements, radio waves 108 may be generated in relatively narrow beams for both transmission and reception, which can be beneficial for purposes of object differentiation (e.g., static versus dynamic) as described herein. (The use of multiple antenna elements may be beneficial in certain communication applications to compensate for the relatively high free space path loss in the 60 GHz medium.) In other aspects, additional or alternative frequencies may be used. In some aspects, for example, fifth generation (5G) frequency bands (e.g., 28 GHz) may be used.

A Digital Signal Processor (DSP) or other processing unit (not shown) may be communicatively coupled with the radar communication component 100 (e.g., incorporated into an electronic device together with the radar communication component 100) and may coordinate the transmission and receipt of radio waves 108. Here, because the radar communication component 100 may be utilized in communication applications, the pulses of the radio waves 108 may be encoded and decoded in a manner similar to communication applications (rather that of traditional radar applications), which can help ensure efficient use of related hardware and/or software.

According to some aspects, the pulses transmitted by the transmitter antenna array 104 may comprise one or more complementary pairs of Golay sequences. Traditional radar techniques may use linear Frequency Modulated Continuous Wave (FMCW), m-sequence, Ipatov, and/or other Channel Impulse Response (CIR) estimation techniques. However, the use of Golay sequences can be adventitious in at least two ways. First, Golay sequences are used in existing communication technologies, and therefore using Golay sequences can take advantage of any existing hardware and/or software optimizations made for the communication technologies. Second, Golay sequences have better resilience to interference than alternative techniques, such as FMCW.

According to the 802.11ad and 802.11ay specifications, a pulse structure may comprise, among other things, a Channel Estimation Field (CEF) with complementary pairs of Golay sequences. Thus, in some aspects, the pulses transmitted by the transmitter antenna array 104 and received by the receiver antenna array 106 may comprise these CEF fields. In fact, because no data (other than the Golay sequences) is transmitted, other fields in the pulse structure may be dropped, thereby reducing the size and length of the pulses, which can increase scanning speed and decrease power consumption. When complementary pairs of sequences are received by an antenna element of the receiver antenna array 106, each sequence is cross-correlated, then added with the cross-correlation of the other sequence, resulting in a delta function that provides a very good CIR property.

Figure 1B:
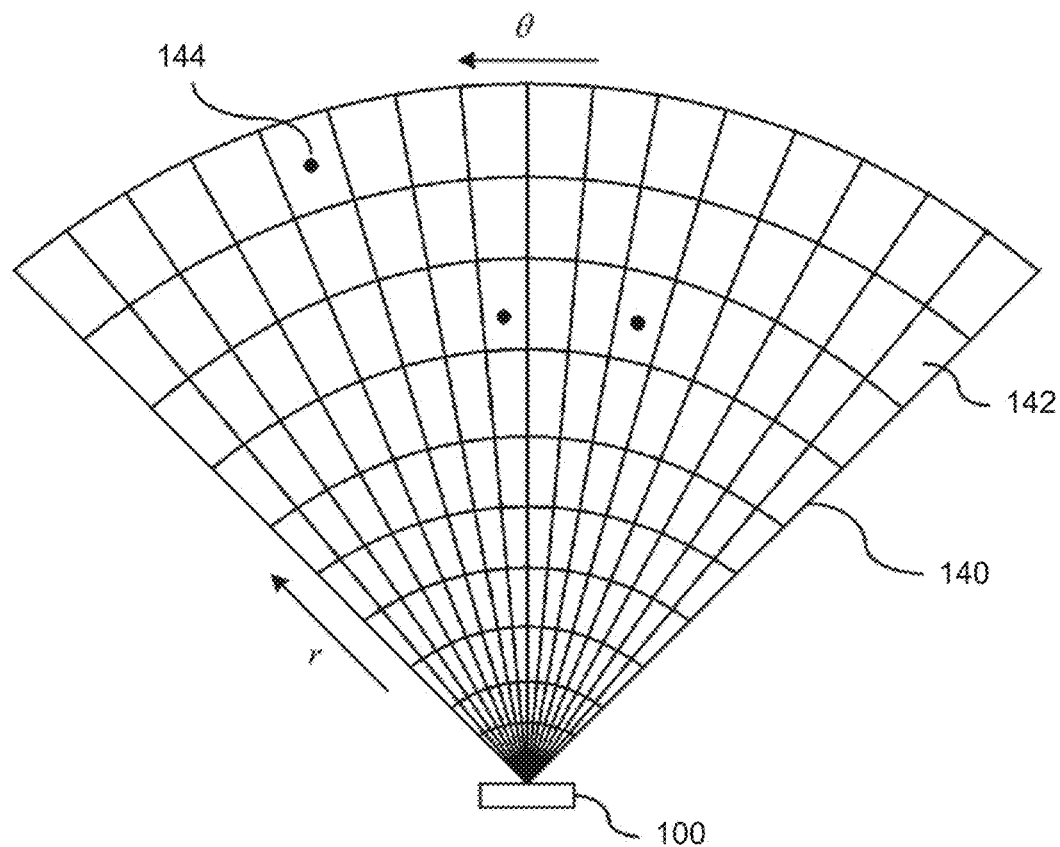
FIG. 1B is a schematic of a sensed occupancy radar grid, according to various aspects of the disclosure.

FIG. 1B illustrates a sensed occupancy radar grid, according to aspects of the disclosure. The transmitter antenna array 104 transmits radar waves 108 in the direction the transmitter antenna array 104 is pointing (e.g., identification region 102). As described above, the pulses of the radio waves 108 that reflect off object(s) (e.g., object 110) in the transmission path of the radio waves 108, and a portion of the radio waves 108 that reflect off the object(s) are returned to the receiver antenna array 106 of the radar communication component 100.

In an aspect, the radar communication component 100 may use beamforming to scan horizontally and vertically. Beamforming is a technique used to aim the effective direction of a radar beam by changing the phase between different transmitting antennas so that the radio signals add constructively in a specified direction. Thus, the radar communication component 100 may scan horizontally and vertically across the sensing area (e.g., identification region 102) by using a transmitter comprising an array of electronically steered antennas (i.e., transmitter antenna array 104). As used herein, a direction towards which the radar communication component 100 beamforms is referred to as a "sector."

In an aspect, the radar communication component 100, specifically, the transmitter antenna array 104, transmits a plurality of pulses during a plurality of bursts of a radar frame (also referred to as a scanning period). That is, a radar frame, or scanning period, comprises a plurality of bursts, each of the plurality of bursts comprising a plurality of pulses. In an aspect, the transmitter antenna array 104 beamforms each pulse in a particular direction, that is, towards a particular sector. Thus, the number of pulses corresponds to the number of directions or sectors in which the transmitter antenna array 104 beamforms.

Reflections of a pulse transmitted by the transmitter antenna array 104 in a given sector are received by the receiver antenna array 106. For each pulse received at the receiver antenna array 106, complex I/Q samples may be obtained, indicative of a CIR (e.g., amplitude (A) and phase (Φ) of the received RF signal) for the respective transmitter/receiver antenna pair used to transmit/receive the pulse. Collectively, these I/Q samples may comprise a "radar image." Additionally, as described further below, a scanning period may further include multiple "taps," or range bins, to represent depth information, which may be based on the CIR.

The electromagnetic field generated by the radar communication component 100 is characterized as an occupancy grid 140 having a plurality of observation cells 142. Features 144 are extracted from the cells 142 to determine whether the feature 144 is an object (e.g., object 110). Each feature 144 within a respective cell 142 can be identified as having up to four parameters: range, Doppler, azimuth, and elevation. As an example, a feature 144 within a cell 142 may be the signal-to-noise ratio (SNR) computed by a constant false alarm rate (CFAR) algorithm. However, it should be understood that other methods may be used to target and identify features 144 within a cell 142.

Figure 3:
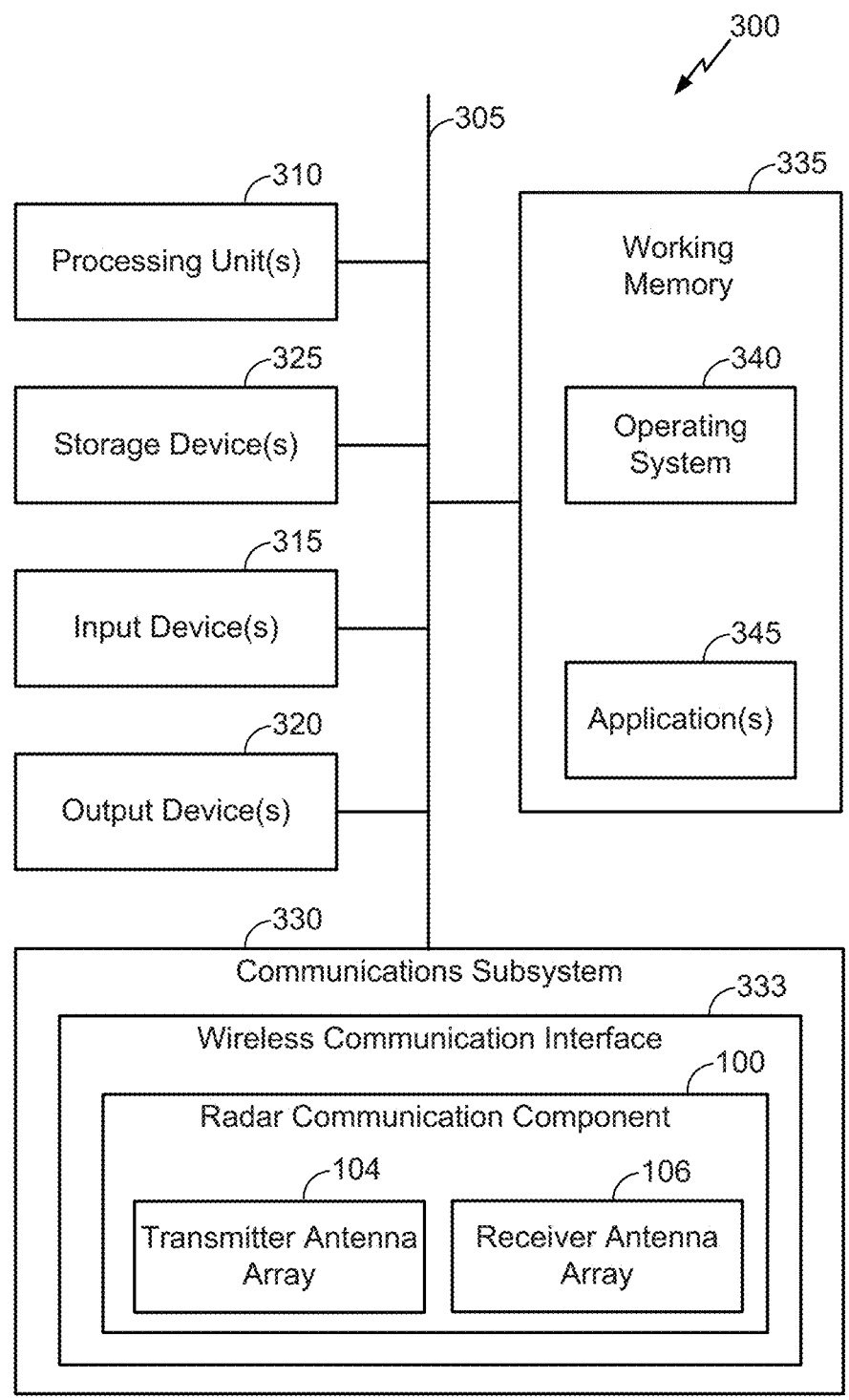
FIG. 3 illustrates an exemplary electronic device, according to aspects of the disclosure.

One or more processor(s) (e.g., processing unit(s) 310 in FIG. 3) generate four dimensional (4D) tensors for features 144 within cells 142 of the occupancy grid 140 detected by the radar communication component 100. The generated tensors represent the range (distance from the radar communication component 100 to the detected feature 144), azimuth (the horizontal angle between a feature 144 and radar communication component 100), Doppler (indicating the relative angular speed of the detected feature 144), and elevation (vertical angle from the radar communication component 100 to the detected feature) of each detected feature 144. The processor(s) can then perform object detection, object classification, localization, and property estimation based on the tensors.

Figure 2A:
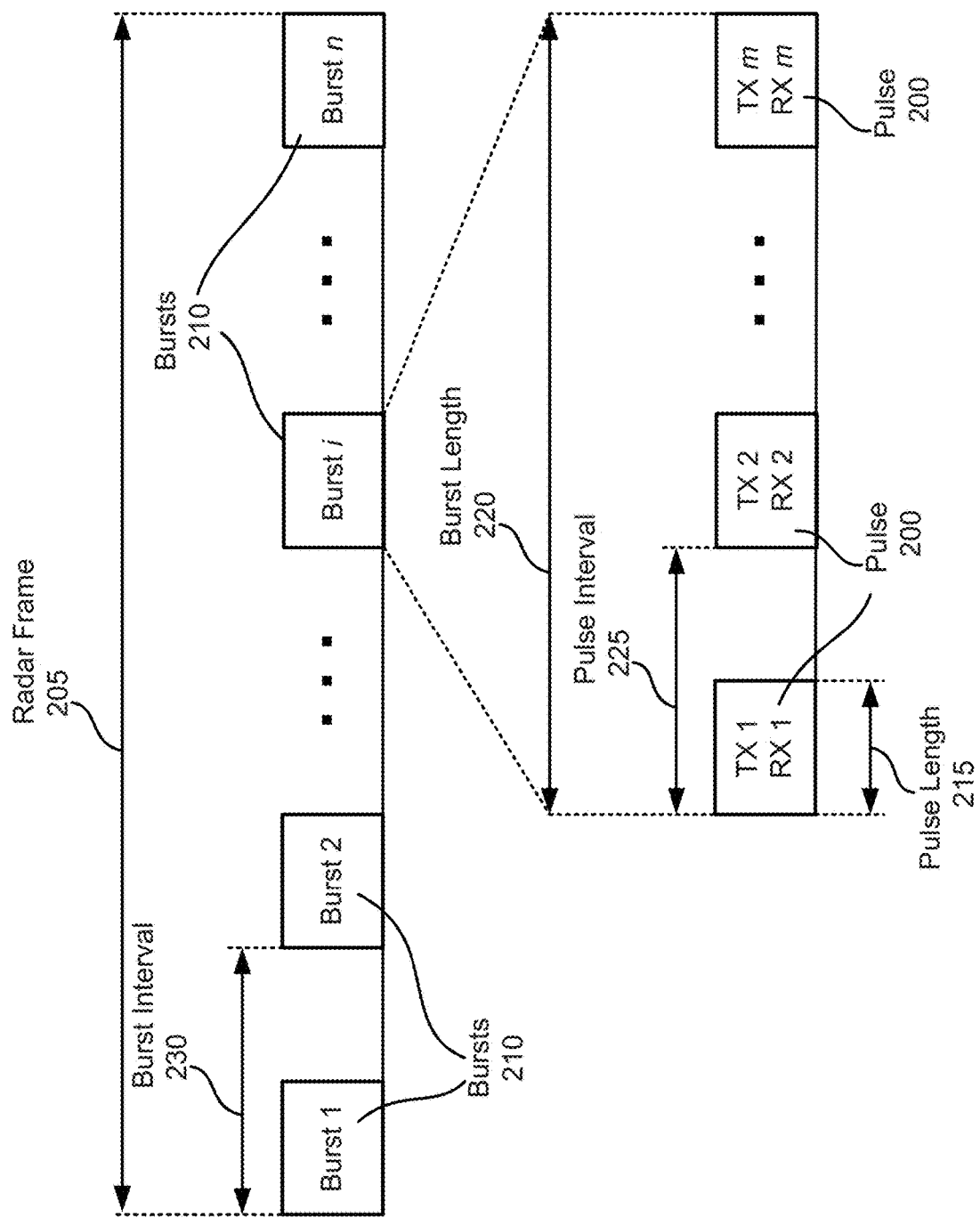
FIG. 2A is an illustration of how pulses may be transmitted during a radar frame, according to aspects of the disclosure.

FIG. 2A is an illustration of how pulses 200 may be transmitted during a radar frame 205 (or scanning period), according to aspects of the disclosure. Specifically, over the course of a radar frame 205, n "bursts" 210 are transmitted, each burst having a burst length 220 and a burst interval 230 between the start of consecutive bursts 210. For a given burst i, the ith transmitter antenna element transmits m pulses 200, a pulse 200 for each of m sectors in which the radar communication component 100 beamforms.

As previously indicated, pulses 200 may comprise one or more complementary pairs of Golay sequences, which may vary in length, depending on desired functionality. In an aspect, where a pulse 200 comprises a field of an 802.11ad pulse, for example, the pulse length 215 is 0.655 μs. Where a pulse 200 comprises a CEF field of an 802.11ay pulse, the pulse length 215 is 0.727 μs. Not only may the pulse length 215 vary, but also the burst length 220 and radar frame 205, depending on desired functionality. The burst length 220 may be dependent not only on the pulse length 215, but also the pulse interval 225. In the example of FIG. 2A, the pulse interval 225 comprises a roughly 50% duty cycle between transmission of pulses 200 and periods between transmissions. Burst interval 230 illustrates a similar duty cycle between bursts 210. However, the duty cycles of the pulse interval 225 and/or burst interval 230 may be adjusted to accommodate different burst lengths 220 and/or radar frames 205. The length of the radar frame 205 may be adjusted to accommodate periods in which the transmitter antenna array 104 and/or receiver antenna array 106 may be utilized for other functions, such as communication. In an aspect, the radar frame 205 may be 320 milliseconds (ms), the burst interval 230 may be 10 ms, the burst length 220 may be 160 μs, and the pulse interval 225 may be 10 μs.

According to some aspects, analog and/or digital beamforming may be used on the receiving side. That is, different weights may be applied to different CIRs of a scan to allow digital synthesizing of a beam in a particular direction with a certain azimuth and elevation. Depending on the available hardware and/or software used to perform the beamforming, weights may be applied to CIRs with floating-point accuracy, allowing for high precision beamforming often not available with analog beamforming.

According to aspects herein, once the scanning period is complete and CIRs have been obtained, the resulting I/Q samples (or real values derived therefrom) may comprise a feature vector that can be analyzed to differentiate static and dynamic objects in an identification region 102.

Figure 2B:
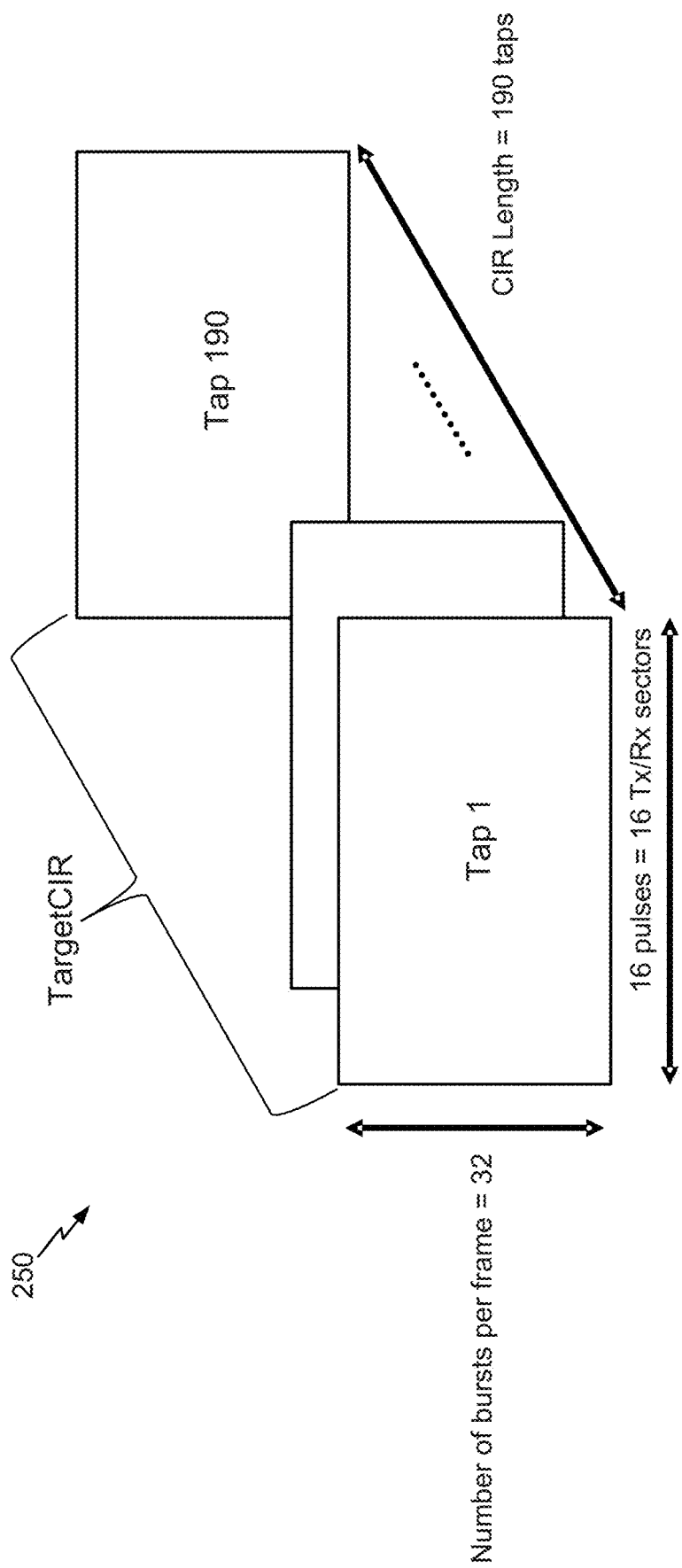
FIG. 2B is a diagram of an exemplary channel impulse response, according to aspects of the disclosure.

FIG. 2B is a diagram 250 of an exemplary target information cube, according to aspects of the disclosure. A cube representing three dimensions of information can be generated for each radar frame: the pulses of the radar frame can be mapped to the x-axis, the bursts of the radar frame can be mapped to the y-axis, and the CIR of the received reflections of a given pulse of a corresponding burst of the radar frame can be mapped to the z-axis, resulting in a cube, as in FIG. 2B. In the example of FIG. 2B, a radar frame (or scanning period) comprises 32 bursts (e.g., bursts 210) of 16 pulses (e.g., pulses 200), meaning there are 16 transmit/receive sectors in which the radar communication component 100 beamforms. The CIR length is 190 taps.

FIG. 3 illustrates an exemplary electronic device 300, according to aspects of the disclosure, which may incorporate a radar-based liveliness detection system as described herein. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner. In addition, it can be noted that components illustrated by FIG. 3 can be localized to a single device and/or distributed among various networked devices, which may be disposed at different physical or geographical locations. The electronic device 300 may comprise and/or be incorporated into any of a variety of devices, including a wireless local area network (WLAN) access point, a cellular base station (e.g., eNodeB, gNodeB, etc.), a "smart" speaker (e.g., an Amazon Echo, Google Home, Apple HomePod, etc.) or other Internet of Things (IoT) device, a mobile phone, tablet computer, personal computer (PC), laptop computer, security device (e.g., camera, floodlight, etc.), and/or the like.

The electronic device 300 is shown comprising hardware elements that can be electrically coupled via a bus 305 (or may otherwise be in communication, as appropriate). The hardware elements may include processing unit(s) 310, which can include without limitation one or more general-purpose processors, one or more special-purpose processors (such as a DSP, GPU, ASIC, FPGA, and/or the like), and/or other processing structures, which can be configured to perform one or more of the methods described herein. The electronic device 300 also can include one or more input devices 315, which can include without limitation a mouse, a keyboard, a camera, a microphone, and/or the like; and one or more output devices 320, which can include without limitation a display device (e.g., a touchscreen, one or more light-emitting diodes (LEDs), a printer, and/or the like.

The electronic device 300 may further include (and/or be in communication with) one or more non-transitory storage devices 325, which can comprise, without limitation, local and/or network accessible storage, and/or can include, without limitation, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The electronic device 300 may also include a communications subsystem 330, which can include support of wireline communication technologies and/or wireless communication technologies (in some aspects) managed and controlled by a wireless communication interface 333. The communications subsystem 330 may include a modem, a network card (wireless or wired), an infrared communication device, a wireless communication device (e.g., transceiver), and/or a chipset (e.g., transmit/receive processor), and/or the like. The communications subsystem 330 may include one or more input and/or output communication interfaces, such as the wireless communication interface 333, to permit data and signaling to be exchanged with a network, mobile devices, other computer systems, and/or any other electronic devices described herein. In an aspect, the radar communication component 100 in FIG. 1A may be incorporated into the wireless communication interface 333 such that antenna elements in the transmitter antenna array 104 and receiver antenna array 106, and the circuitry connected with the antenna elements, may be used for both the radar imaging techniques described herein and wireless data communication. For example, in some aspects, the wireless communication interface 333 may comprise an 802.11ad- and/or 802.11ay-compatible modem capable of both the radar imaging techniques described herein and wireless data communication using the radar communication component 100.

The wireless communication interface 333 may comprise an integrated device (e.g., embodied as a transmitter circuit and a receiver circuit of a single communication device) in some implementations, and in others, may comprise a separate transmitter device and a separate receiver device, or may be embodied in other ways in other implementations. In an aspect, a transmitter may include a plurality of antennas, such as transmitter antenna array 104, that permits the electronic device 300 to perform transmit "beamforming," as described further herein. Similarly, a receiver may include a plurality of antennas, such as receiver antenna array 106, that permits the electronic device 300 to perform receive beamforming, as described further herein.

In many aspects, the electronic device 300 may further comprise a working memory 335, which can include a RAM and/or or ROM device. Software elements, shown as being located within the working memory 335, can include an operating system 340, device drivers, executable libraries, and/or other code, such as application(s) 345, which may comprise computer programs provided by various aspects, and/or may be designed to implement methods, and/or configure systems, provided by other aspects, as described herein. Merely by way of example, one or more procedures described with respect to the method(s) discussed below may be implemented as code and/or instructions that are stored (e.g., temporarily) in working memory 335 and are executable by a computer (and/or a processing unit within a computer such as processing unit(s) 310); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 325 described above. In some cases, the storage medium might be incorporated within a computer system, such as electronic device 300. In other aspects, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the electronic device 300 and/or might take the form of source and/or installable code, which, upon compilation and/or installation on the electronic device 300 (e.g., using any of a variety of generally available compilers, installation programs, compression/decompression utilities, etc.), then takes the form of executable code.

As noted above, there are uses for mmW frequency bands besides wireless communication. The present disclosure provides techniques to detect the liveliness of nearby objects (e.g., within the same room) using mmW radar, particularly, 60 GHz radar. The "liveliness" of an object is an indication of whether or not the target object is dynamic (i.e., moving) or static (i.e., stationary). Objectives of the disclosed techniques are to map a room's layout, detect the presence and location of dynamic objects within the room (e.g., people, pets, etc.), combine gesture recognition, and detect obstacles (e.g., furniture, appliances, etc.). The use of 60 GHz radar can provide highly accurate distance, angle, and velocity measurements due to its high bandwidth, short wavelength, and large TX and RX antenna arrays. The techniques described herein may be implemented by any 60 GHz capable (i.e., IEEE 802.11ad/11ay capable) communication device, such as a Home gNodeBs, a smart speaker, a UE, etc.

As would be appreciated, there are a number of benefits to being able to detect dynamic objects within a space. For example, the ability to detect one or more people within a room can be beneficial for smart home or office controls, such as adjusting the thermostat, turning lights on or off, locking or unlocking doors, triggering security alarms, etc. While such detection can usually be accomplished with a camera, cameras, especially within the home, raise privacy concerns. For example, many users are uncomfortable with the idea of constantly being under video surveillance, especially in their home, and the streaming and/or storage of such video data is susceptible to hacking. Thus, there is a significant benefit to being able to detect dynamic objects within a space using radar as opposed to camera. Radar, although it can in some cases provide reasonably detailed images of a target object, cannot provide anywhere near the same level of detail that video can. As such, the use of radar for liveness detection should alleviate the privacy concerns raised by the use of cameras, while still providing all of the benefits.

Figure 4:
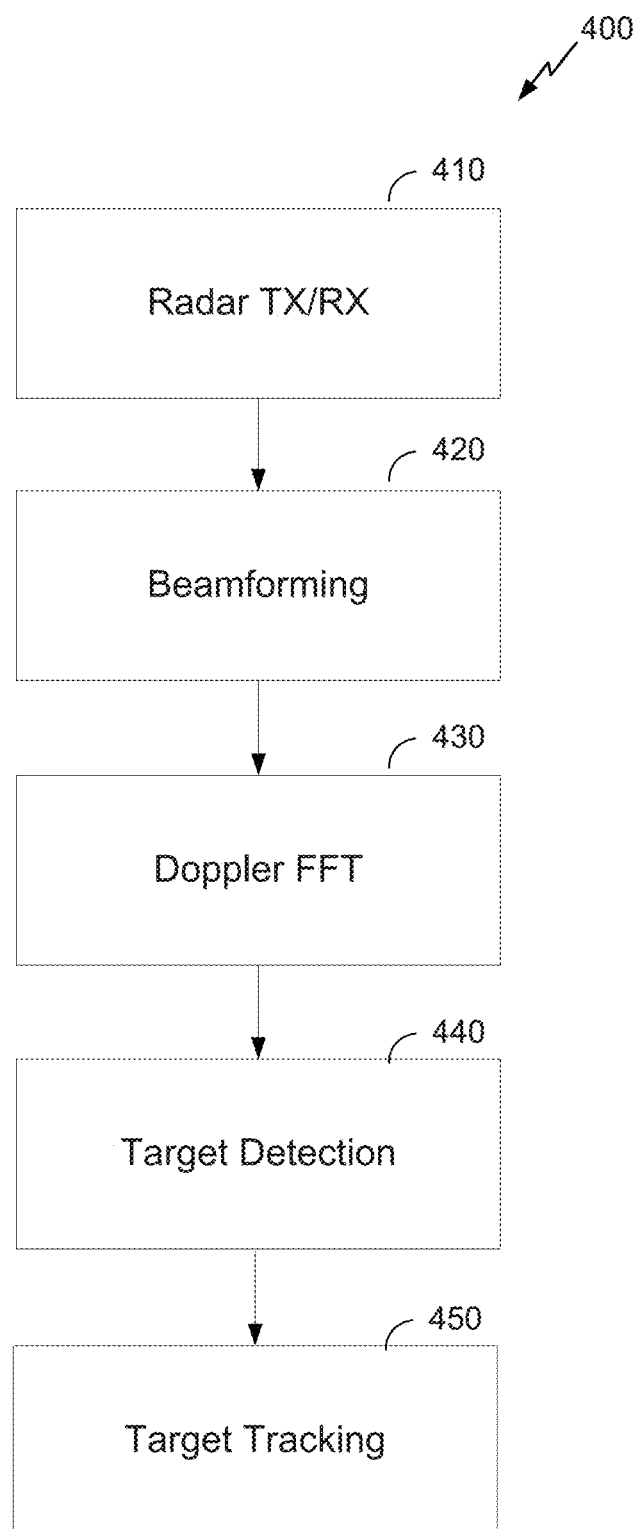
FIG. 4 illustrates an exemplary method for detecting the liveliness of a target object, according to aspects of the disclosure.

FIG. 4 illustrates an exemplary method 400 for detecting the liveliness of a target object, according to aspects of the disclosure. At stage 410, a radar transmit (TX)/receive (RX) stage, the radar CIR is generated using a compressed pulse (e.g., Golay sequences) for CIR computation (vs. FMCW), as described above with reference to FIG. 2. At stage 420, a beamforming stage, an antenna pattern (as discussed further below with reference to FIG. 7) is used as a steering vector for all azimuth and elevation directions on the angle grid (as discussed further below with reference to FIG. 8) for each burst (e.g., burst 210) in the radar frame (e.g., radar frame 205). From that, a four-dimensional (4D) radar image in the space of {azimuth, elevation, range, and slow time (bursts)} can be obtained. In an aspect, hybrid beamforming (analog transmit/receive sectors and digital beamforming) can be used to achieve large range and directionality determinations.

At stage 430, a Doppler Fast-Fourier Transform (FFT) stage, an FFT is applied on the 4D radar image along the slow time dimension (i.e., along the bursts), resulting in a 4D radar image in {azimuth, elevation, range, velocity} space. Target liveliness (motion) can be identified by using the maximal non-DC (direct current) FFT bin (i.e., the velocity bin) as a liveliness measure. Note, the "DC bin" is the bin that corresponds to 0 frequency when FFT is performed. Different time-scales can be used in the Doppler FFT computation to adapt for a slow or fast moving target. The maximal non-DC FFT bin for each time-scale is computed, and then the maximum over all time-scales is computed and used for target object detection. To cancel background and leakage, the DC FFT bin is zeroed. That is, the DC FFT bin is ignored to filter out static objects, resulting in a radar image showing only dynamic objects (e.g., radar image 520 in FIG. 5 below).

At stage 440, a target detection stage, two methods are jointly used for target detection: (1) a Constant False-Alarm Rate (CFAR) detection is applied over the range, azimuth, and/or elevation dimensions and (2) Signal-to-Noise Ratio (SNR) thresholding with distance based accounting is applied. CFAR is used in radar systems to detect target returns against a background of noise, clutter, and interference. The CFAR is the power threshold above which any return can be considered to originate from a target. If this threshold is too low, then more targets will be detected at the expense of an increased numbers of false alarms. Conversely, if the threshold is too high, then fewer targets will be detected, but the number of false alarms will also be low. SNR is defined as the ratio of the signal power to the noise power, expressed in decibels, and thereby compares the level of a desired signal to the level of background noise. A ratio higher than 1:1 (greater than 0 dB) indicates more signal than noise. Thus, only targets with an SNR exceeding the SNR threshold are detected.

At stage 450, a target tracking stage, a very simple tracking scheme can be used to reduce false alarms. Further, tracking can be enhanced by adding a Kalman filter or other more enhanced tracking scheme.

Figure 5:
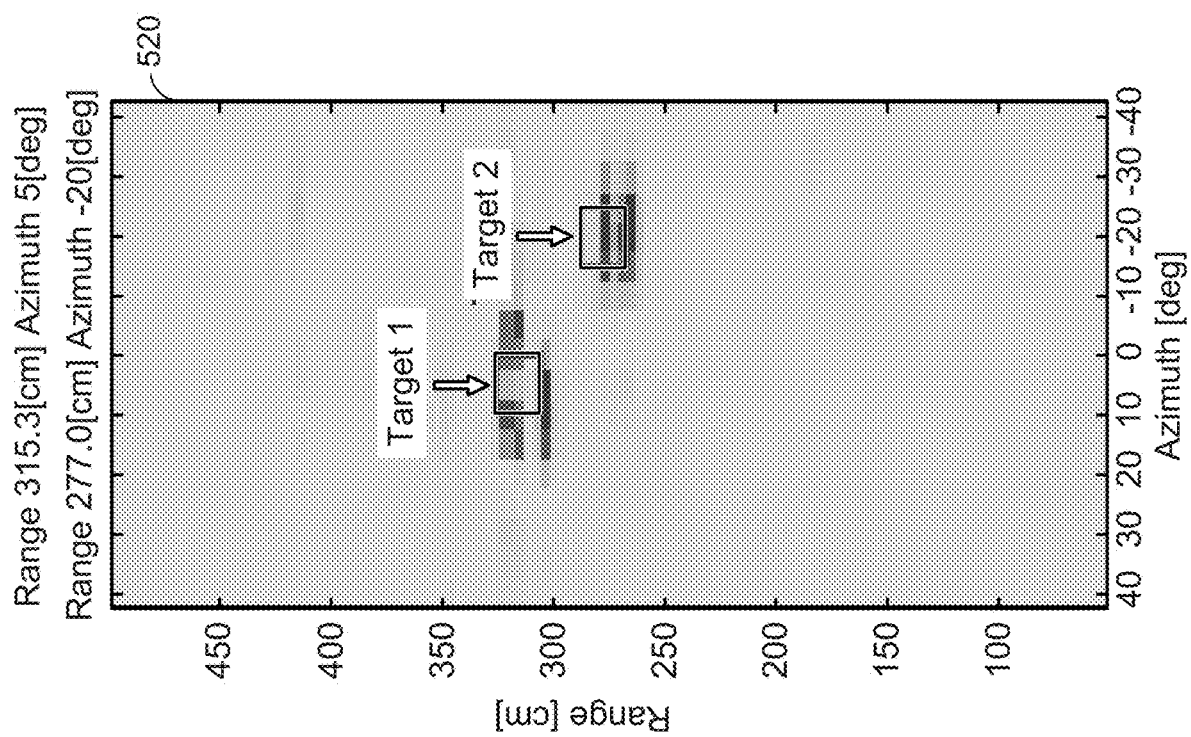
FIG. 5 illustrates an example scenario in which an electronic device detects two dynamic objects, according to aspects of the disclosure.
Figure 5:
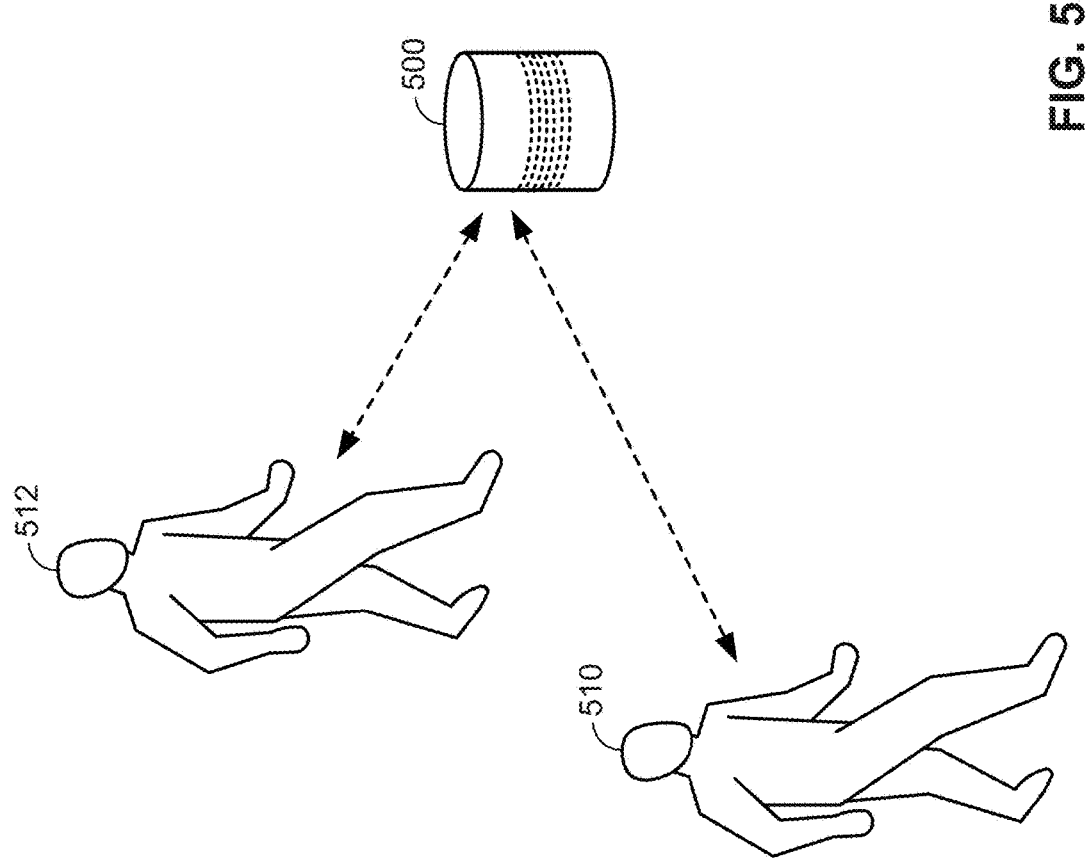

FIG. 5 illustrates an example scenario in which an electronic device 500 (illustrated as a smart speaker, and which may correspond to electronic device 300 in FIG. 3) detects two dynamic objects 510 and 512, according to aspects of the disclosure. Specifically, as shown in FIG. 5, the electronic device 500 has captured one or more radar images of a scene in which two dynamic objects 510 and 512 are present, as described above with reference to FIGS. 1A to 2. The electronic device 500 processes the generated radar images as described above with reference to FIG. 4 to generate a radar image 520, in which a first dynamic object 510, identified as "Target 1," has been detected at a range of 315.3 centimeters (cm) and an azimuth of 5 degrees, and a second dynamic object 512, identified as "Target 2," has been detected at a range of 277.0 cm and an azimuth of −20 degrees.

After processing the captured radar images as described above with reference to FIG. 4, the resulting radar image 520 is a 2D representation of the SNR of the radar pulses (e.g., pulses 200) that were reflected off of the two dynamic objects 510 and 512 during transmission of one or more radar frames (e.g., radar frame(s) 205) and received back at the transmitting electronic device 500. As shown in FIG. 5, a detected dynamic object is generally shown as a cluster of differently shaded pixels. The shading indicates the intensity of the SNR reading for that pixel. As can be seen, the SNR of a detected object (e.g., dynamic object 510/512) is generally higher at the center of the cluster of pixels representing the object, and lower at the edges of the cluster. No shading indicates that there is no SNR reading for that pixel. This convention is followed throughout this disclosure.

Figure 6A:
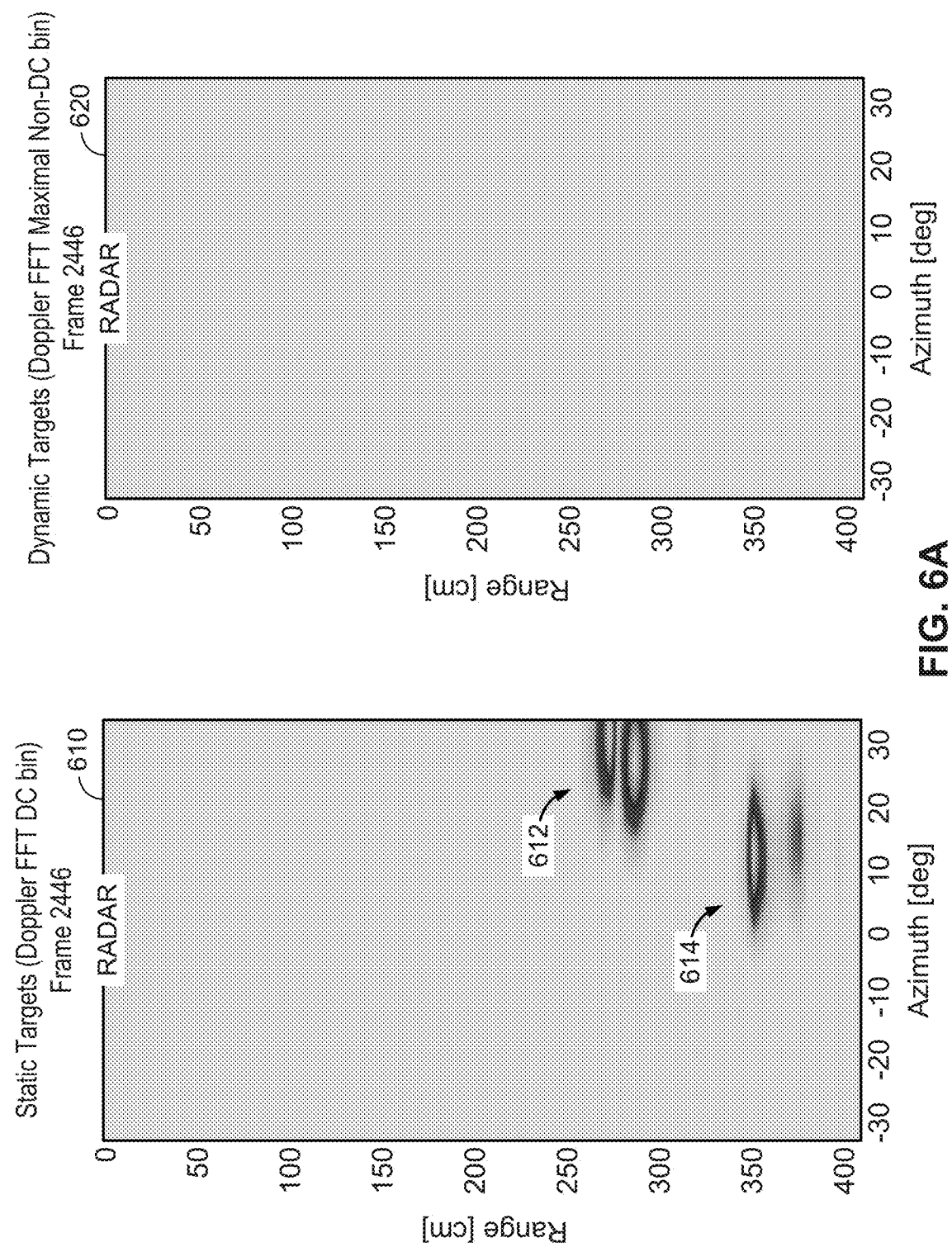
FIGS. 6A and 6B illustrate differences between the Doppler FFT direct current (DC) bin and the Doppler FFT non-DC bin, according to aspects of the disclosure.
Figure 6B:
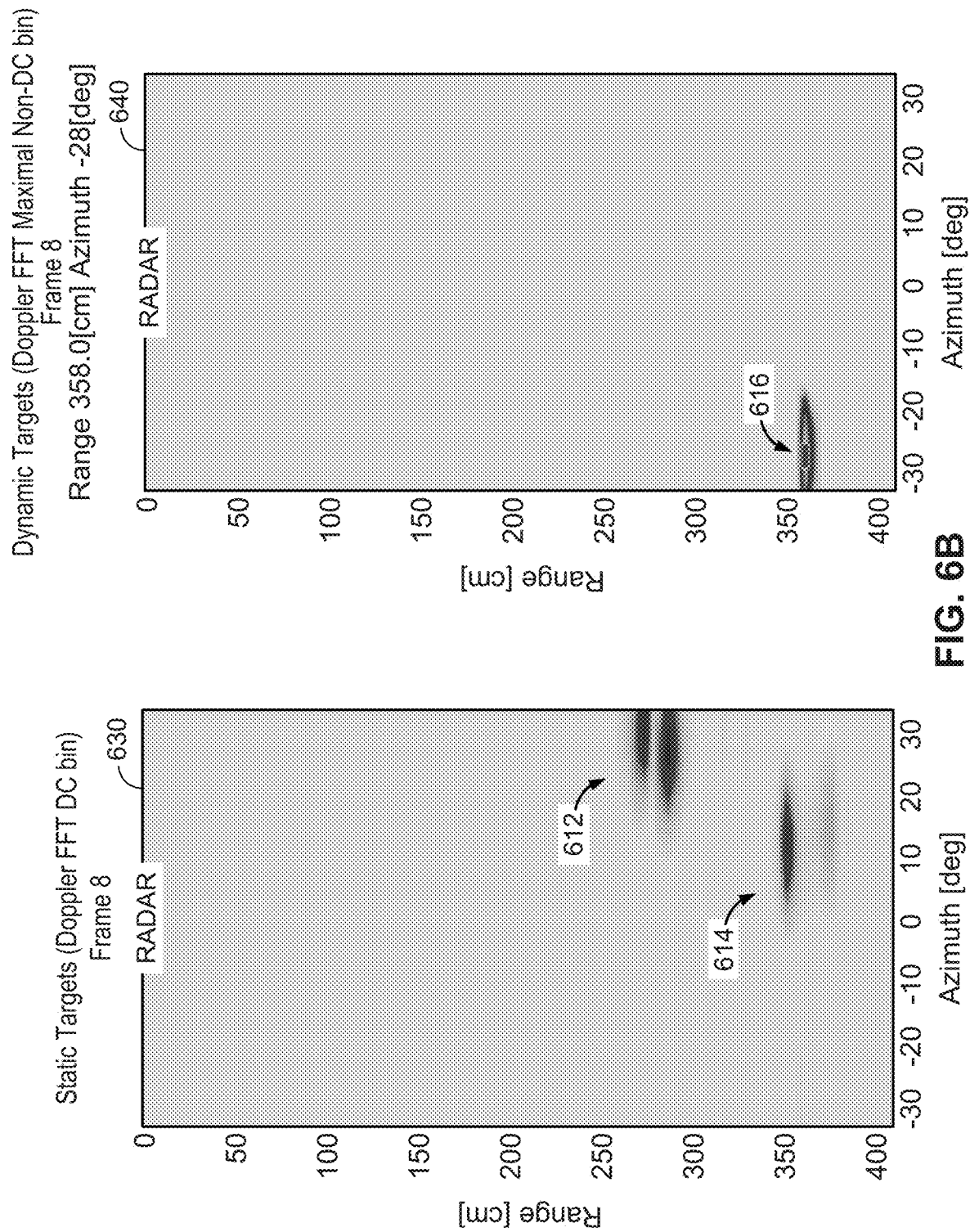

FIGS. 6A and 6B illustrate differences between the Doppler FFT DC bin and the Doppler FFT non-DC bin, according to aspects of the disclosure. Specifically, FIG. 6A illustrates an example scenario in which an electronic device (e.g., electronic device 500) detects two static target objects 612 and 614, according to aspects of the disclosure. Specifically, as shown in FIG. 6A, two static, as opposed to dynamic, target objects 612 and 614 have been identified in the Doppler FFT DC bin 610 of a radar frame (numbered "2446" in the example of FIG. 6A). In contrast, the Doppler FFT non-DC bin 620 of the same radar frame is empty, showing that there were no dynamic objects in the field of view of the electronic device at the time the radar image 2446 was captured.

FIG. 6B illustrates an example scenario in which an electronic device (e.g., electronic device 500) detects two static target objects 612 and 614 and a dynamic target object 616, according to aspects of the disclosure. Specifically, as shown in FIG. 6B, the same two static target objects 612 and 614 that were identified in the Doppler FFT DC bin 610 of the radar frame in FIG. 6A have been identified in the Doppler FFT DC bin 630 of a second radar frame (numbered "8" in the example of FIG. 6B). In contrast, a dynamic target object 616 has been identified in the Doppler FFT non-DC bin 640 of the same radar frame. The dynamic target object 616 has been identified at a range of 358.0 cm and an azimuth of −28 degrees.

Referring back to FIG. 4, and to stage 410 specifically, in an aspect, the liveliness detection techniques described herein may use an antenna array 700 (which may correspond to transmitter antenna array 104) of 32 antenna elements having the specific layout shown in FIG. 7. In an aspect, the antenna elements of antenna array 700 may be used for both transmission and reception, or the antenna array 700 may be a transmit antenna array (e.g., transmitter antenna array 104) and there may be a separate receiver antenna array (not shown). Where the antenna array 700 is used for both transmission and reception, all 32 antenna elements may be used for transmission and a subset (e.g., 18) may be used for reception, or all antenna elements may also be used for reception. Alternatively, only a subset of the antenna elements may be used for transmission, and all or a subset of the antenna elements may be used for reception.

In an aspect, the antenna elements may be 60 GHz antenna elements, but the disclosure is not so limited, and they may instead be other frequency mmW antenna elements. Further, the illustrated antenna layout is merely exemplary, and other antenna layouts could be used. Referring back to FIG. 7, in cases where sectors are used for transmission/reception, some number of transmit antenna elements are used to beamform a pulse 200 in a given direction (i.e., sector). For example, the 18 shaded antenna elements in the antenna array 700 could be used to beamform in a particular direction (i.e., towards a particular sector). Note that the number of bursts 210 stems from the Doppler resolution (also referred to as "velocity resolution") desired. More specifically, the Doppler resolution is proportional to the inverse of the number of bursts 210, meaning that the greater the number of bursts, the lower the Doppler resolution, and vice versa.

In an aspect, the liveliness detection described herein may utilize multiple transmit/receive sectors for enhanced coverage of the field of view of the radar sensor (e.g., radar communication component 100). The field of view of a radar sensor may be represented as a grid, with each box of the grid (referred to as a "sector") having a corresponding elevation and azimuth. The radar sensor may beamform (transmit and/or receive) in the direction of a particular sector.

Referring back to FIG. 4, and to stage 420 specifically, the measured antenna pattern provides information about the phase and amplitude of every antenna element for all azimuth and elevation angles on a measured grid. Note that the measured antenna pattern is the actual (i.e., measured) RF output pattern of a given antenna element, and can be represented as a graph, such as graph 800 in FIG. 8. The normalized antenna pattern (i.e., a normalization of the measured antenna pattern) can be used as a steering vector, and conventional beamforming can be used for all azimuth and elevation directions on the angle grid for each burst (e.g., burst 210) of a radar frame (e.g., radar frame 205). From that, a 4D radar image in the space of {azimuth, elevation, range, and slow time (bursts)} can be obtained. In an aspect, the elevation can be set to zero, and therefore, will depend on the location/elevation of the electronic device (e.g., on a counter, a table, a nightstand, etc.).

Still referring back to FIG. 4, and to stage 430 specifically, the FFT can be applied to the 4D radar image along the time dimension (i.e., along the bursts) to obtain a full 4D radar image in {azimuth, elevation=0, range, velocity} space. In an aspect, the FFT can be applied on different time scales in order to increase sensitivity to slow or fast changes of a target dynamic object. Stage 430 is described further below with reference to FIG. 9.

Figure 8:
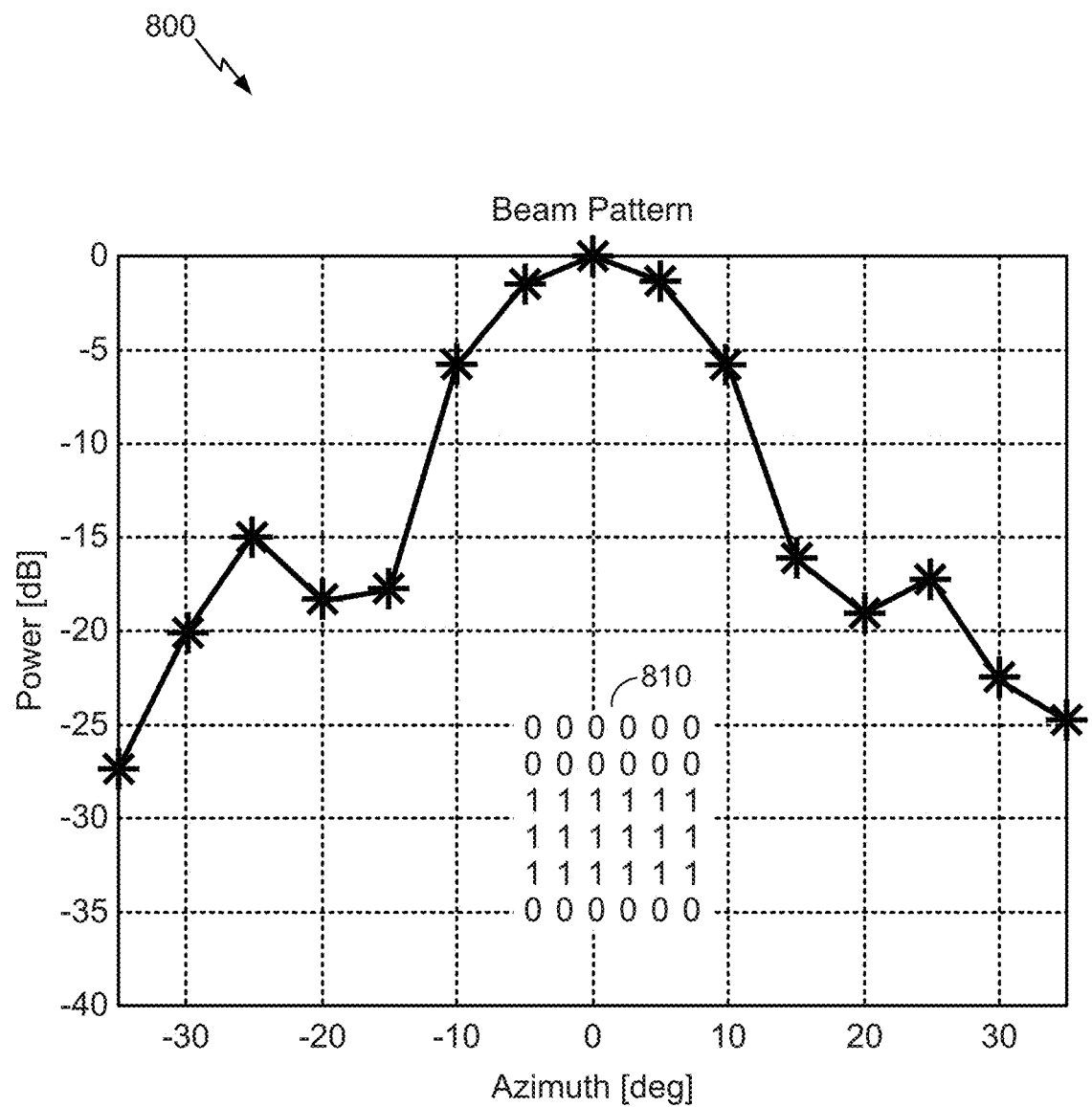
FIG. 8 illustrates an exemplary graph of a beam pattern, according to aspects of the disclosure.

FIG. 8 illustrates an exemplary graph 800 of a beam pattern where 18 transmit antenna elements have been activated (illustrated as "1"s in the array 810) and the beamwidth is 3 decibels (dB), or 15 degrees.

In an aspect, for an antenna element/sector, the antenna/sector response (the amplitude and phase response for a given azimuth and elevation of the antenna element/sector) is given by:

$$a_{n_{TX}}(Az,El), a_{n_{RX}}(Az,El),$$

where $n_{TX}$ and $n_{RX}$ are the antenna/sector indices for the transmitter and receiver, respectively. In an aspect, for multiple transmit antennas/sectors, the antenna/sector array response is given by:

$$a(Az, El) = \begin{bmatrix} a_{n_{TX,1}}(Az, El)a_{n_{RX,1}}(Az, El) \\ a_{n_{TX,2}}(Az, El)a_{n_{RX,2}}(Az, El) \\ a_{n_{TX,3}}(Az, El)a_{n_{RX,3}}(Az, El) \\ \ldots \\ \ldots \\ a_{n_{TX,N-2}}(Az, El)a_{n_{RX,N-2}}(Az, El) \\ a_{n_{TX,N-1}}(Az, El)a_{n_{RX,N-1}}(Az, El) \\ a_{n_{TX,N}}(Az, El)a_{n_{RX,N}}(Az, El) \end{bmatrix},$$

where $n_{TX,1}, \ldots, n_{TX,N}$ and $n_{RX,1}, \ldots, n_{RX,N}$ are the set of selected transmit and receive antenna elements/sectors, respectively.

The beamformer is the normalized array response, which is represented as:

$$a_{BF}(Az, El) = \frac{a(Az, El)}{\sqrt{a^H(Az, El)a(Az, El)}}$$

where H is the Hermitian operator. The target model for a single target object k is represented as:

$$x_k = a(Az_0, El_0)s_k + v_k$$

where k is the index for the target, s is the target, and v is noise. The beamforming operation is represented as:

$$Y_k(Az,El) = a_{BF}^H(Az,El)x_k$$

Figure 9:
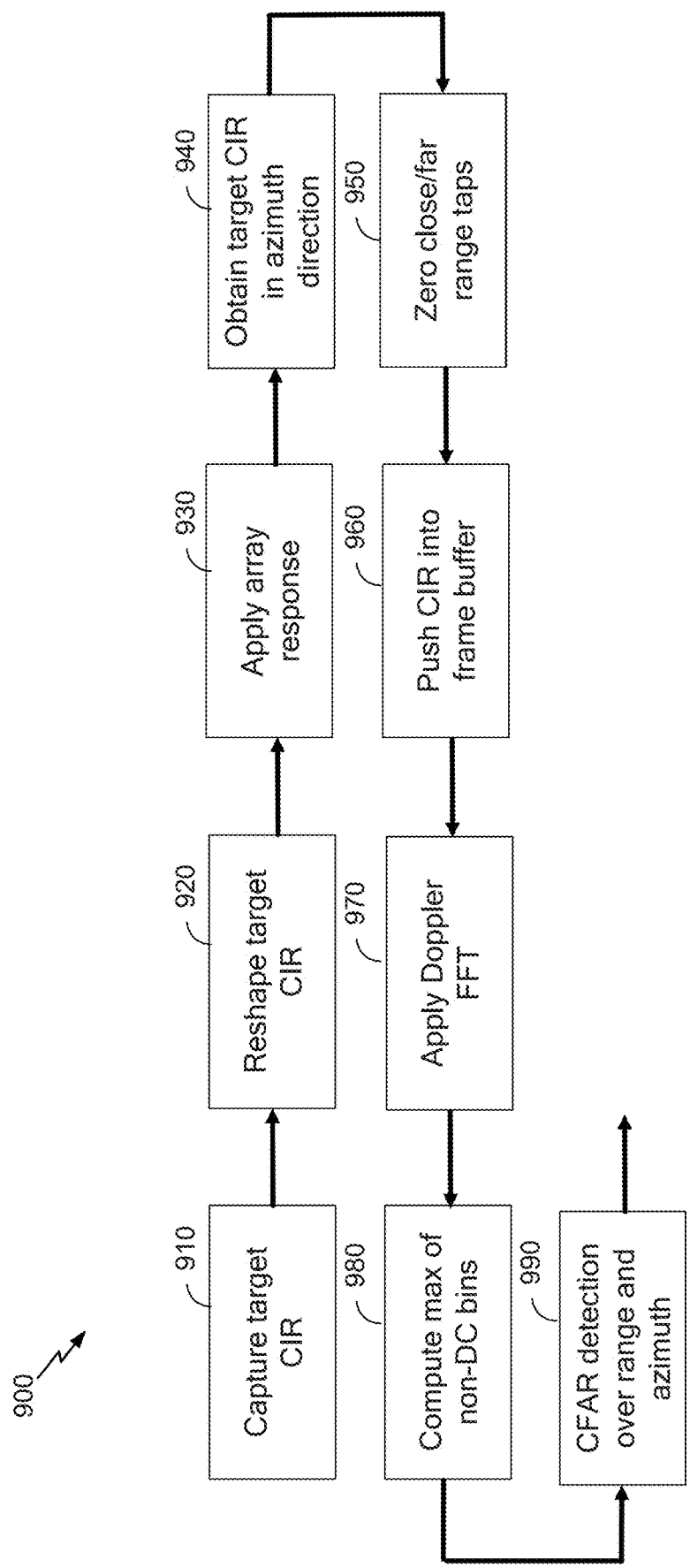
FIG. 9 illustrates an exemplary method of processing radar frames, according to aspects of the disclosure.

FIG. 9 illustrates an exemplary method 900 of processing radar frames, according to aspects of the disclosure. The method 900 may be performed by the electronic device 300. At 910, the method 900 includes measuring the CIR corresponding to a detected target object. At 920, the method 900 includes reshaping the target CIR. Stages 910 and 920 are part of stage 410 of FIG. 4.

At 930, the method 900 includes applying the array response. At 940, the method 900 includes obtaining the target CIR in the azimuth direction. Stages 930 and 940 are part of stage 420 of FIG. 4.

At 950, the method 900 includes zeroing the close or far range taps. At 960, the method 900 includes pushing the CIR into the frame buffer.

At 970, the method 900 includes applying the Doppler FFT. Stage 970 is part of stage 430 of FIG. 4.

At 980, the method 900 includes computing the maximum of the non-DC bins. At 990, the method 900 includes performing CFAR detection over the range and azimuth measurements. Stages 980 and 990 are part of stage 440 of FIG. 4.

Referring back to FIG. 4, specifically the target detection stage 440, a live target map is derived first, according to a predefined region of interest (ROI) map and a CFAR map. In an aspect, the live target map may be a binary map. The non-DC radar image is multiplied (element-by-element) by the binary map. Next, the radar image for target detection is processed inside a "for" loop. In each iteration of the loop, the maximum is identified. The maximum is then processed through an additional SNR-based detection.

Specifically, on top of the CFAR detector is an additional SNR-based detector. First, the mean and maximum inside the detection window (around the maximum) is computed. Then, the SNR based threshold is computed, taking into account the distance to the target object. If the window mean passes the threshold or the window maximum passes the threshold plus, for example, 6 dB, then the target object is registered as a dynamic object.

Finally, the target detection stage at 440 includes zeroing the region around the target. The resulting image can now serve as the input to the loop for additional target detection.

Figure 10:
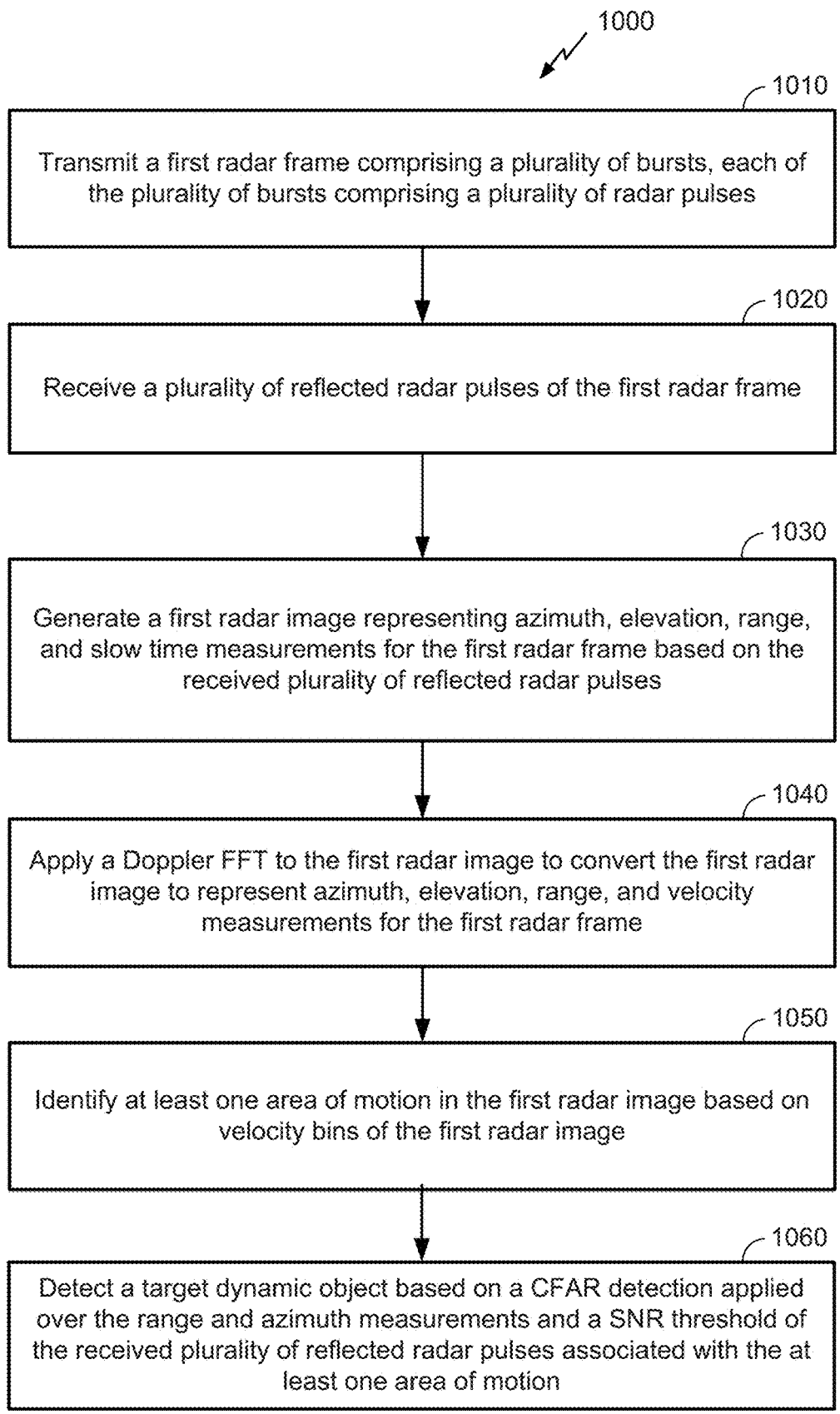
FIG. 10 illustrates an exemplary method for liveliness detection using radar, according to aspects of the disclosure.

FIG. 10 illustrates an exemplary method 1000 for liveliness detection using radar, according to aspects of the disclosure. The method 1000 may be performed by an electronic device, such as electronic device 300. In an aspect, the electronic device may be a smart speaker, a UE, an IoT device, a small cell base station, or the like.

At 1010, a radar sensor (e.g., radar communication component 100) of an electronic device (e.g., electronic device 300) transmits a first radar frame (e.g., radar frame 205) comprising a plurality of bursts (e.g., bursts 210), each of the plurality of bursts comprising a plurality of radar pulses (e.g., pulses 200), as described above with reference to stages 410 and 420 of FIG. 4. In an aspect, a number of the plurality of bursts may be based on a Doppler resolution desired to detect movement of a target dynamic object. In an aspect, the radar sensor may include an array of a plurality of transmit antenna elements capable of transmit beamforming, as discussed above with reference to FIG. 7. In an aspect, the radar sensor may also include an array of a plurality of receive antenna elements. The array of the plurality of receive antenna elements may be a separate antenna array from the array of the plurality of transmit antenna elements, or may be a subset of the array of the plurality of transmit antenna elements. In an aspect, the array of the plurality of receive antenna elements may be capable of receive beamforming. In an aspect, the radar sensor may be configured for wireless communication on a mmW frequency band, such as a 60 GHz frequency band.

At 1020, the radar sensor receives a plurality of reflected radar pulses of the first radar frame, as described above with reference to stages 410 and 420 of FIG. 4.

At 1030, the electronic device (e.g., processing unit(s) 310 and/or wireless communication interface 333) generates a first radar image representing azimuth, elevation, range, and slow time measurements for the first radar frame based on the received plurality of reflected radar pulses, as described above with reference to stage 420 of FIG. 4. In an aspect, the first radar frame may be transmitted in a subset of a plurality of sectors of a field of view of the electronic device. In an aspect, the azimuth and elevation measurements may be based on azimuth and elevation information corresponding to the subset of the plurality of sectors. In an aspect, the radar sensor beamforms the plurality of pulses in a direction of the subset of the plurality of sectors.

At 1040, the electronic device (e.g., processing unit(s) 310 and/or wireless communication interface 333) applies a Doppler FFT to the first radar image to convert the first radar image to represent azimuth, elevation, range, and velocity measurements for the first radar frame, as described above with reference to stage 430 of FIG. 4. In an aspect, the Doppler FFT is applied on different time scales in order to increase sensitivity to slow or fast changes in motion of a target dynamic object.

At 1050, the electronic device (e.g., processing unit(s) 310 and/or wireless communication interface 333) identifies at least one area of motion in the first radar image based on velocity bins (e.g., non-DC FFT bin) of the first radar image, as described above with reference to stage 430 of FIG. 4. In an aspect, the method 1000 may further include filtering Doppler FFT DC bins from the first radar image (not shown).

At 1060, the electronic device (e.g., processing unit(s) 310 and/or wireless communication interface 333) detects a target dynamic object based on a CFAR detection applied over the range and azimuth measurements and a SNR threshold of the received plurality of reflected radar pulses associated with the at least one area of motion, as described above with reference to stage 440 of FIG. 4.

It can be noted that, although particular frequencies, integrated circuits (ICs), hardware, and other features are described in the aspects herein, alternative aspects may vary. That is, alternative aspects may utilize additional or alternative frequencies (e.g., other the 60 GHz and/or 28 GHz frequency bands), antenna elements (e.g., having different size/shape of antenna element arrays), scanning periods (including both static and dynamic scanning periods), electronic devices (e.g., WLAN APs, cellular base stations, smart speakers, IoT devices, mobile phones, tablets, personal computer (PC), etc.), and/or other features. A person of ordinary skill in the art will appreciate such variations.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for personalized face verification with radar images.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of liveliness detection using radar, comprising:
    transmitting, by a radar sensor of an electronic device, a first radar frame comprising a plurality of bursts, each of the plurality of bursts comprising a plurality of radar pulses;
    receiving, at the radar sensor, a plurality of reflected radar pulses of the first radar frame;
    generating, by the electronic device, a first radar image representing azimuth, elevation, range, and slow time measurements for the first radar frame based on the received plurality of reflected radar pulses;
    applying, by the electronic device, a Doppler Fast Fourier Transform (FFT) to the first radar image to convert the first radar image to represent azimuth, elevation, range, and velocity measurements for the first radar frame;
    identifying, by the electronic device, at least one area of motion in the first radar image based on velocity bins of the first radar image; and
    detecting, by the electronic device, a target dynamic object based on a Constant False-Alarm Rate (CFAR) detection applied over the range and azimuth measurements and a Signal-to-Noise Ratio (SNR) threshold of the received plurality of reflected radar pulses associated with the at least one area of motion.

2. The method of claim 1, wherein the radar sensor comprises an array of a plurality of transmit antenna elements capable of transmit beamforming.

3. The method of claim 2, wherein the radar sensor comprises an array of a plurality of receive antenna elements separate from the array of the plurality of transmit antenna elements.

4. The method of claim 1, wherein the radar sensor is configured for wireless communication on a millimeter wave (mmW) frequency band.

5. The method of claim 4, wherein the mmW frequency band comprises a 60 GHz frequency band.

6. The method of claim 1, wherein the first radar frame is transmitted in a subset of a plurality of sectors of a field of view of the electronic device.

7. The method of claim 6, wherein the azimuth and elevation measurements are based on azimuth and elevation information corresponding to the subset of the plurality of sectors.

8. The method of claim 6, wherein the radar sensor beamforms the plurality of pulses in a direction of the subset of the plurality of sectors.

9. The method of claim 1, wherein the Doppler FFT is applied on different time scales in order to increase sensitivity to changes in motion of the target dynamic object.

10. The method of claim 1, further comprising filtering Doppler FFT direct current (DC) bins from the first radar image.

11. The method of claim 1, wherein the velocity bins comprise maximal non-DC FFT bins.

12. The method of claim 1, wherein the electronic device comprises a smart speaker, a user equipment, an Internet of Things (IoT) device, or a base station.

13. The method of claim 1, wherein a number of the plurality of bursts is based on a Doppler resolution desired to detect movement of the target dynamic object.

14. An apparatus for liveliness detection using radar, comprising:
    a radar sensor configured to:
        transmit a first radar frame comprising a plurality of bursts, each of the plurality of bursts comprising a plurality of radar pulses; and
        receive a plurality of reflected radar pulses of the first radar frame; and
    at least one processor configured to:
        generate a first radar image representing azimuth, elevation, range, and slow time measurements for the first radar frame based on the received plurality of reflected radar pulses;
        apply a Doppler Fast Fourier Transform (FFT) to the first radar image to convert the first radar image to represent azimuth, elevation, range, and velocity measurements for the first radar frame;
        identify at least one area of motion in the first radar image based on velocity bins of the first radar image; and
        detect a target dynamic object based on a Constant False-Alarm Rate (CFAR) detection applied over the range and azimuth measurements and a Signal-to-Noise Ratio (SNR) threshold of the received plurality of reflected radar pulses associated with the at least one area of motion.

15. The apparatus of claim 14, wherein the radar sensor comprises an array of a plurality of transmit antenna elements capable of transmit beamforming.

16. The apparatus of claim 15, wherein the radar sensor comprises an array of a plurality of receive antenna elements separate from the array of the plurality of transmit antenna elements.

17. The apparatus of claim 14, wherein the radar sensor is configured for wireless communication on a millimeter wave (mmW) frequency band.

18. The apparatus of claim 17, wherein the mmW frequency band comprises a 60 GHz frequency band.

19. The apparatus of claim 14, wherein the first radar frame is transmitted in a subset of a plurality of sectors of a field of view of the electronic device.

20. The apparatus of claim 19, wherein the azimuth and elevation measurements are based on azimuth and elevation information corresponding to the subset of the plurality of sectors.

21. The apparatus of claim 19, wherein the radar sensor beamforms the plurality of pulses in a direction of the subset of the plurality of sectors.

22. The apparatus of claim 14, wherein the Doppler FFT is applied on different time scales in order to increase sensitivity to changes in motion of the target dynamic object.

23. The apparatus of claim 14, further comprising filtering Doppler FFT direct current (DC) bins from the first radar image.

24. The apparatus of claim 14, wherein the velocity bins comprise maximal non-DC FFT bins.

25. The apparatus of claim 14, wherein the apparatus comprises a smart speaker, a user equipment, an Internet of Things (IoT) device, or a base station.

26. The apparatus of claim 14, wherein a number of the plurality of bursts is based on a Doppler resolution desired to detect movement of the target dynamic object.

27. An apparatus for liveliness detection using radar, comprising:
a means for wirelessly communicating configured to:
transmit a first radar frame comprising a plurality of bursts, each of the plurality of bursts comprising a plurality of radar pulses; and
receive a plurality of reflected radar pulses of the first radar frame; and
a means for processing configured to:
generate a first radar image representing azimuth, elevation, range, and slow time measurements for the first radar frame based on the received plurality of reflected radar pulses;
apply a Doppler Fast Fourier Transform (FFT) to the first radar image to convert the first radar image to represent azimuth, elevation, range, and velocity measurements for the first radar frame;
identify at least one area of motion in the first radar image based on velocity bins of the first radar image; and
detect a target dynamic object based on a Constant False-Alarm Rate (CFAR) detection applied over the range and azimuth measurements and a Signal-to-Noise Ratio (SNR) threshold of the received plurality of reflected radar pulses associated with the at least one area of motion.

28. The apparatus of claim 27, wherein the velocity bin comprises a maximal non-direct current (non-DC) FFT bin.

29. The apparatus of claim 27, further comprising filtering a Doppler FFT direct current (DC) bin from the first radar image.

30. A non-transitory computer-readable medium storing computer-executable instructions for liveliness detection using radar, the computer-executable instructions comprising:
at least one instruction instructing a radar sensor of an electronic device to transmit a first radar frame comprising a plurality of bursts, each of the plurality of bursts comprising a plurality of radar pulses;
at least one instruction instructing the radar sensor to receive a plurality of reflected radar pulses of the first radar frame;
at least one instruction instructing at least one processor of the electronic device to generate a first radar image representing azimuth, elevation, range, and slow time measurements for the first radar frame based on the received plurality of reflected radar pulses;
at least one instruction instructing the at least one processor to apply a Doppler Fast Fourier Transform (FFT) to the first radar image to convert the first radar image to represent azimuth, elevation, range, and velocity measurements for the first radar frame;
at least one instruction instructing the at least one processor to identify at least one area of motion in the first radar image based on velocity bins of the first radar image; and
at least one instruction instructing the at least one processor to detect a target dynamic object based on a Constant False-Alarm Rate (CFAR) detection applied over the range and azimuth measurements and a Signal-to-Noise Ratio (SNR) threshold of the received plurality of reflected radar pulses associated with the at least one area of motion.

\* \* \* \* \*